US007086198B2

(12) United States Patent
Hayden

(10) Patent No.: US 7,086,198 B2
(45) Date of Patent: Aug. 8, 2006

(54) MACHINE FOR VENDING FLORAL ARRANGEMENTS

(76) Inventor: Lisa Renee Hayden, 2 Myrtle Street, Normanhurst NSW 2076 (AU)

( * ) Notice: Subject to any disclaimer, the term of this patent is extended or adjusted under 35 U.S.C. 154(b) by 0 days.

(21) Appl. No.: 10/807,929

(22) Filed: Mar. 24, 2004

(65) Prior Publication Data

US 2004/0217165 A1 Nov. 4, 2004

(30) Foreign Application Priority Data

Mar. 25, 2003 (AU) ............................ 2003901349

(51) Int. Cl.

| | |
|---|---|
| ***A01G 5/00*** | (2006.01) |
| ***G07F 50/00*** | (2006.01) |
| ***A47F 3/04*** | (2006.01) |
| ***B65G 59/00*** | (2006.01) |
| ***F25D 25/02*** | (2006.01) |

(52) U.S. Cl. ........................ 47/41.01; 47/83; 312/116; 312/125; 312/135; 312/305; 312/284; 221/119; 221/120; 221/155; 221/150 R; 248/27.8; 62/381

(58) Field of Classification Search ............... 47/41.01, 47/83, 39, 41.14, 62 R, 62 A, 17; 248/27.8; 312/116, 125, 135, 305, 284; 221/76, 119, 221/120, 155, 150 R; 235/381; 62/381
See application file for complete search history.

(56) References Cited

U.S. PATENT DOCUMENTS

| | | | | | |
|---|---|---|---|---|---|
| 986,875 | A | * | 3/1911 | Tilghman | 62/250 |
| 1,242,235 | A | * | 10/1917 | Polk | 312/213 |
| 1,393,050 | A | * | 10/1921 | Tally et al. | 312/135 |
| 1,474,847 | A | * | 11/1923 | Phillips et al. | 312/305 |
| 2,875,878 | A | * | 3/1959 | Hoban | 194/244 |
| 3,031,055 | A | * | 4/1962 | Soule | 194/230 |
| 3,146,043 | A | * | 8/1964 | Johnson et al. | 312/97.1 |
| 4,317,604 | A | * | 3/1982 | Krakauer | 312/97.1 |
| 4,498,603 | A | * | 2/1985 | Wittenborg | 221/76 |
| 4,927,051 | A | * | 5/1990 | Falk et al. | 221/12 |
| 5,360,134 | A | | 11/1994 | Falk et al. | |
| 5,971,273 | A | | 10/1999 | Vallaire | |
| 6,123,223 | A | * | 9/2000 | Watkins | 221/121 |
| 6,131,399 | A | * | 10/2000 | Hall | 62/127 |
| 6,990,828 | B1 | * | 1/2006 | Kim et al. | 62/381 |

FOREIGN PATENT DOCUMENTS

| | | | | |
|---|---|---|---|---|
| FR | 2246210 | A | * | 9/1973 |
| FR | 2588107 | A1 | * | 4/1987 |
| FR | 2749960 | | | 12/1997 |
| FR | 2839177 | A | * | 4/2002 |
| JP | 5-76244 | | | 3/1993 |
| JP | 5-182074 | | | 7/1993 |
| JP | 2002140773 | | * | 5/2002 |
| WO | WO 00/73951 | | | 12/2000 |

OTHER PUBLICATIONS

Website Image, Website Address—http://www.photomann.com/japan/machines/dscn2117x.jpg, Download date Jun. 28, 2004, one page.

(Continued)

*Primary Examiner*—Andrea M. Valenti
(74) *Attorney, Agent, or Firm*—Sonnenschein Nath & Rosenthal LLP

(57) ABSTRACT

A machine for vending floral arrangements is described including stack of generally circular carousels each for supporting a plurality of floral arrangements; and a generally cylindrical exterior housing surrounding the carousels.

15 Claims, 3 Drawing Sheets

OTHER PUBLICATIONS

"Flower Vendor"—Brochure—FAS International, six pages.

Website page, "The Floral Touch Kiosk", Website Address—http://www.ohara.com/osi/kiosks/fflora.htm, Download date May 20, 2003, one page.

Website page, "A Business Proposal for a Floral Kiosk in a California Resort", PowerHomeBiz.com—Website Address—http://www.powerhomegiz.com/guide/cases/stacey.htm, Download date May 20, 2003, three pages.

Website page, "Finding The Kiosk 'Killer Application'", Business Solutions—Website Address—http://www.businesssolutionsmag.com/Articles/2001_04/010404.htm, Download date May 20, 2003, four pages.

* cited by examiner

MACHINE FOR VENDING FLORAL ARRANGEMENTS

RELATED APPLICATION DATA

The present application claims priority to Australian Application No. 2003901349 filed Mar. 25, 2003, which application is incorporated herein by reference to the extent permitted by law.

TECHNICAL FIELD

This invention relates to a machine for vending floral arrangements.

SUMMARY OF THE INVENTION

In a first aspect the present invention provides a machine for vending floral arrangements including a stack of generally circular carousels each for supporting a plurality of floral arrangements; and a generally cylindrical exterior housing surrounding the carousels.

By providing a combination of both cylindrical carousels and a cylindrical exterior housing, the space within the machine is utilised efficiently. Further, use of a circular housing provides a machine which makes efficient use of floor space in the location in which it is situated.

The carousels may be stacked together in a modular arrangement.

Each carousel may include a rotary shelf.

The rotary shelf may be perforated to allow air to flow through the shelf.

The exterior housing may further include a transparent dome mounted over the uppermost carousel.

The exterior housing may be substantially air-tight.

The inside of the housing may be refrigerated.

The machine may further include a sensor that is arranged to activate a sound reproduction device when a person is sensed near to the machine.

In a second aspect the present invention provides a machine for vending floral arrangements including a stack of carousels each supporting a plurality of floral arrangements; and each of the plurality of floral arrangements supported on each carousel are vended at the same price.

This arrangement allows for a simplified vending operation. Because each carousel supports floral arrangements of the same price, the machine allows vending from a particular carousel when payment has been made that matches the price of the floral arrangements on a particular carousel.

The carousels may be stacked together in a modular arrangement.

At least one of the carousels may include a rotary shelf.

At least one rotary shelves may include steel dividers that allow removal of only one floral arrangement during a single vending operation.

In a third aspect the present invention provides a machine for vending floral arrangements including at least one carousel for supporting a plurality of floral arrangements; the machine has a front and a back and includes at least one viewing window associated with the carousel, each viewing window being arranged to permit viewing of only one floral arrangement; the at least one viewing window is positioned towards either one or both of the front or back of the machine; and light from outside the machine may reach the floral arrangements on the carousel only by passing through the at least one viewing window.

In this way, the level of light reaching the floral arrangements from outside of the machine is kept to a minimum, whilst still allowing viewing of the contents of the machine.

A light may be provided at an edge of at least one viewing window.

Lights may be provided about four edges of at least one viewing window.

The machine may further include a spotlight arranged to illuminate a floral arrangement viewable through the viewing window.

At least one viewing window may be arranged to allow for vending of floral arrangements through the viewing window.

BRIEF DESCRIPTION OF THE DRAWINGS

An embodiment of the present invention will now be described, by way of example only, with reference to the accompanying drawings, in which.

DETAILED DESCRIPTION OF THE PREFERRED EMBODIMENT

Figure 1:
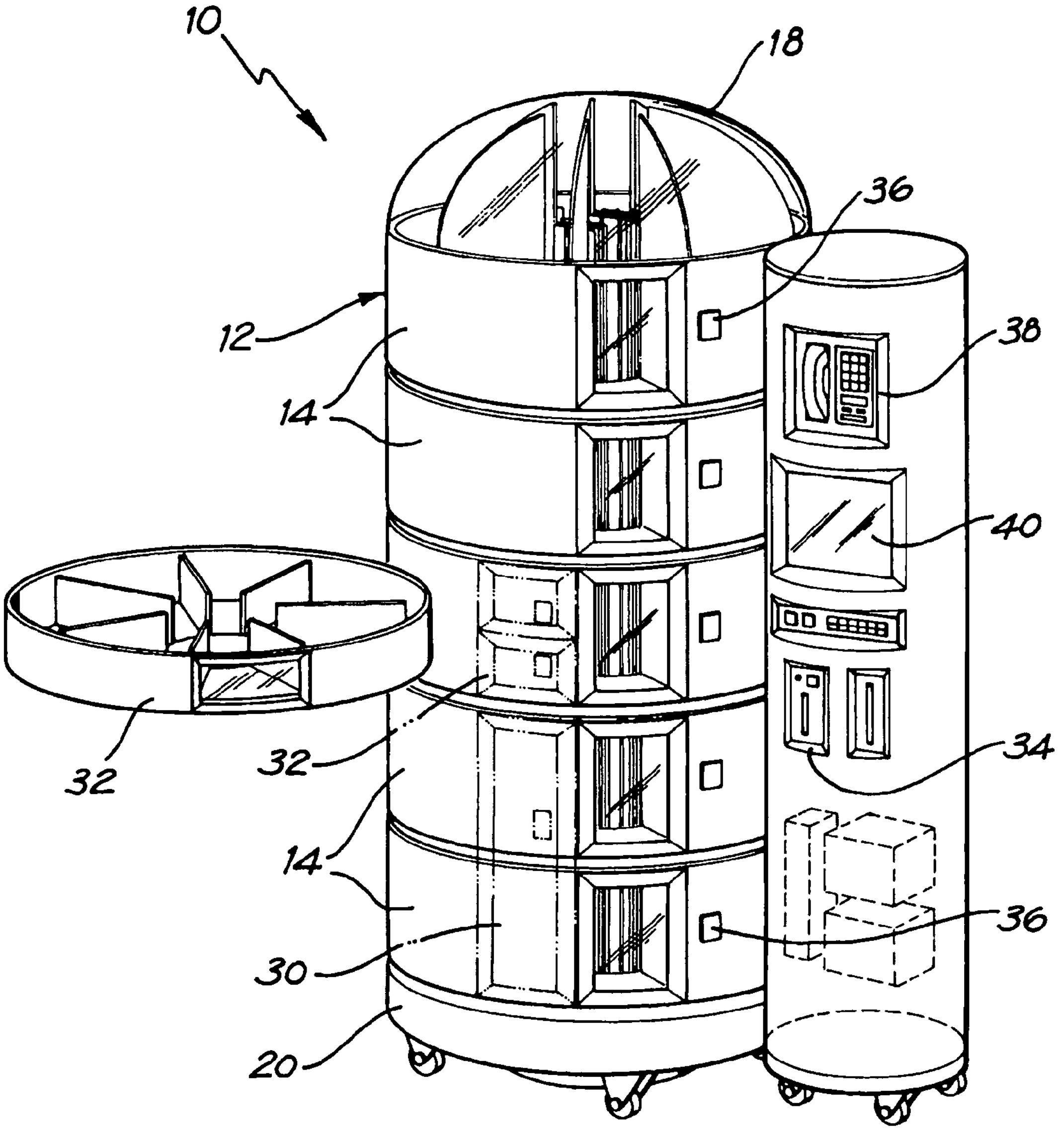
FIG. 1 is a front view of an embodiment of a machine for vending floral arrangements according to the present invention.
Figure 2:
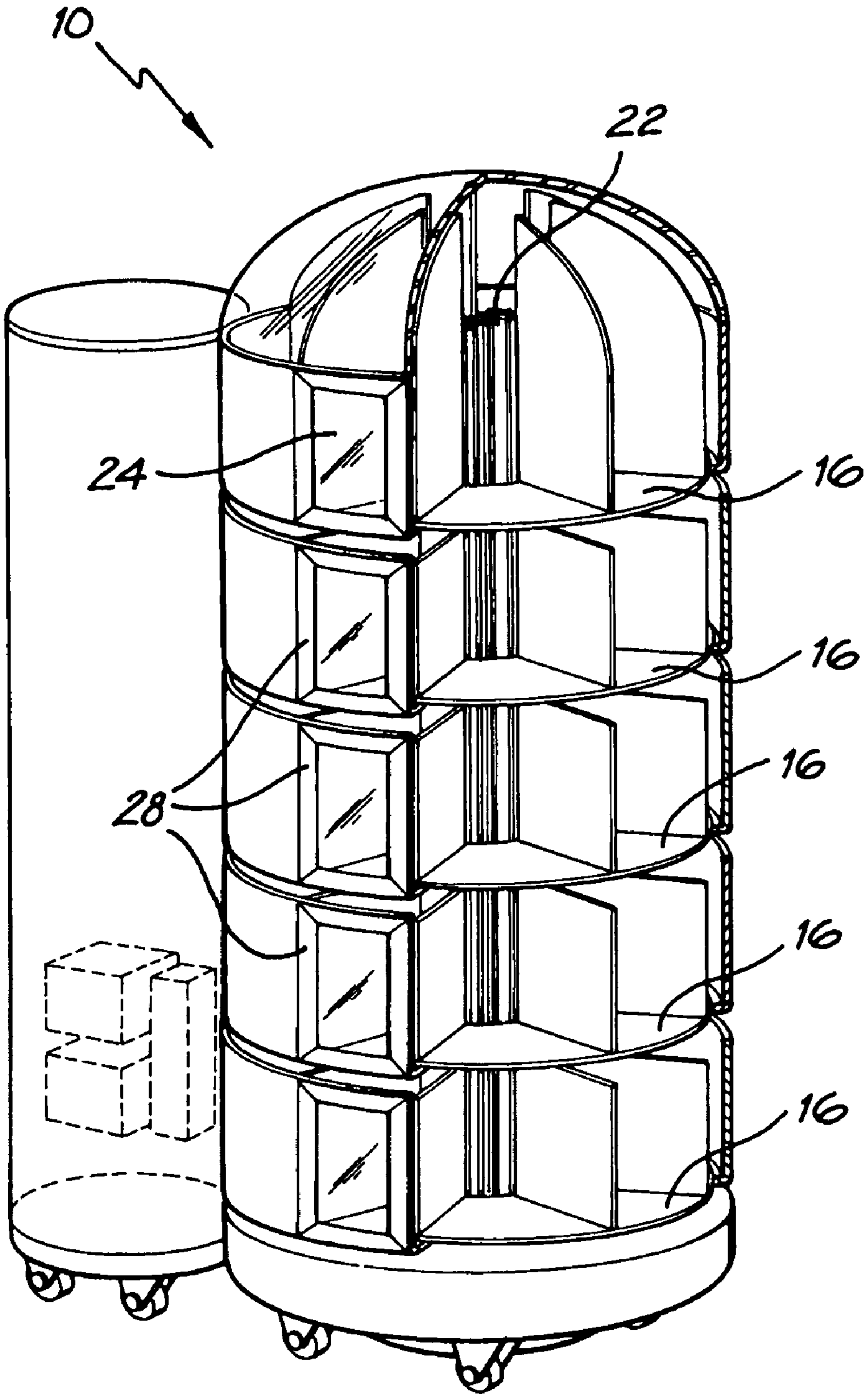
FIG. 2 is a rear and partially cut away view of the machine of FIG. 1.

Referring to FIGS. 1 and 2, a machine 10 is shown for vending floral arrangements. Machine 10 includes a generally circular exterior housing 12 formed by the exteriors of a number of stacked modules 14. Each module 14 houses a carousel in the form of rotary shelf 16 for supporting a number of floral arrangements. Housing 12 further includes dome 18 and base 20.

Housing 12 is substantially air-tight to resist the ingress of gases harmful to the floral arrangements such as ethylene gas that might be encountered at a vehicle service station.

Machine 10 further includes refrigeration coil 22. This coil operates to remove heat from the interior of machine 10. In combination with a thermostat, it is used to control the internal temperature of machine 10 to prolong the storage life of floral arrangements held within the machine.

Dome 18 is transparent to provide increased illumination at the top of the machine. This area of the machine is also warmer than the bottom due to the tendency for warm air to rise. The dome 18 area provides conditions suitable for tropical plants and when stocking the machine tropical plants are preferably positioned at the top of the machine 10.

Figure 3:
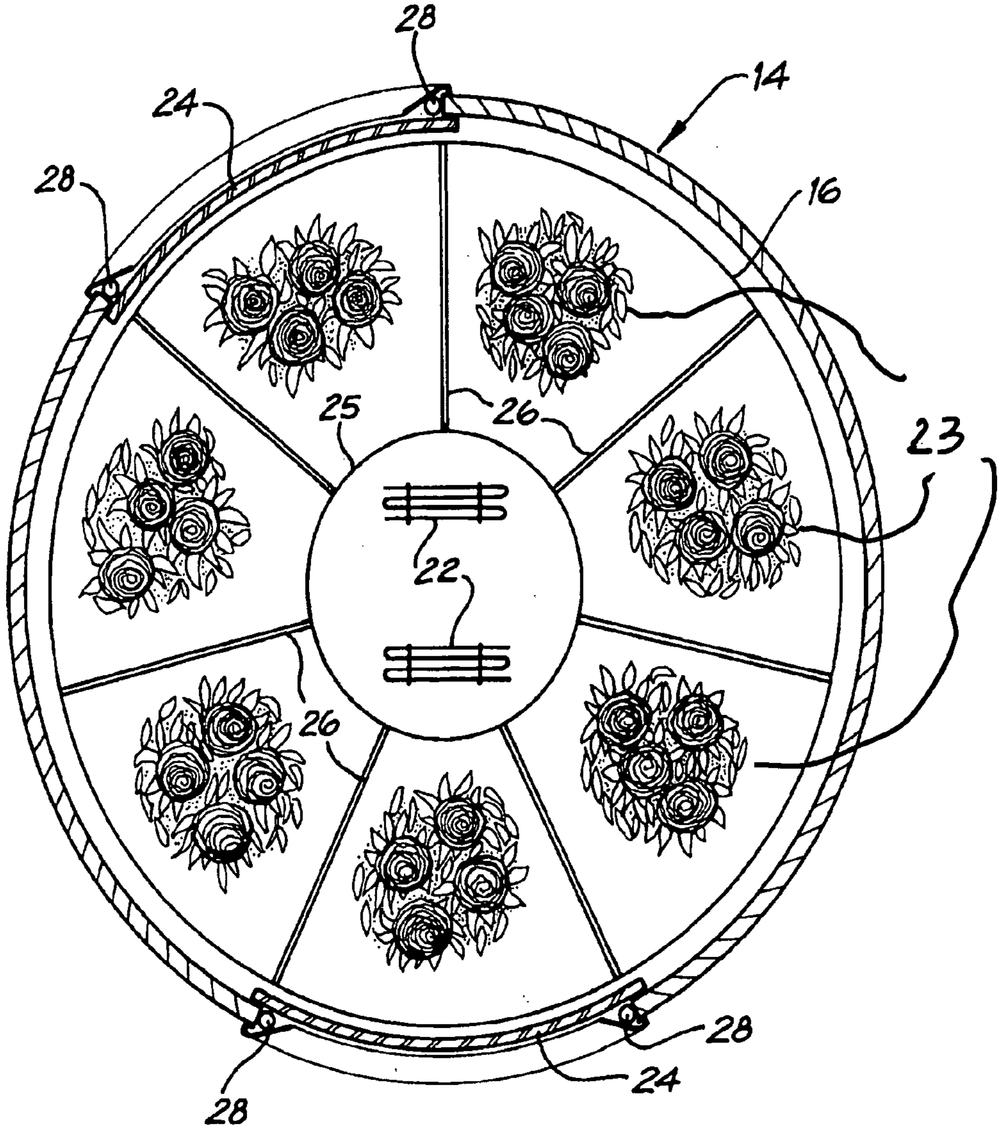
FIG. 3 is a top view of one of the modules of the machine of FIG. 1.

Referring to FIG. 3, a top view of one of the modules 14 of FIG. 1 is shown. Module 14 includes a rotary shelf 16 arranged to support a number of floral arrangements 23. Shelf 16 rotates about hub 25. The shelf is divided into segments by steel dividers 26 and one floral arrangement is positioned in each segment. The dividers in the uppermost module extend upwards to conform to the inside profile of the dome. Module 14 is provided with two viewing windows 24 which allow a person to view one floral arrangement and which also operate as vending hatches. In one embodiment, only one of the viewing windows may operate as a vending hatch.

In use, rotation of shelf 16 is controlled so that it stops only when a floral arrangement positioned in a segment of shelf 16 is aligned with the viewing windows 24. Shelf 16 is perforated to allow air to flow through it.

Referring again to FIGS. 1 and 2, machine 10 is of modular construction. For instance, the two lower modules 14 have been combined to form double height module 30. As a further alternative, half height module 32 could be incorporated into the machine. The height of a viewing window or access door associated with ae module may be altered to conform to the desired modular arrangement. For instance, a double height access door may span two normal height modules. The modular configuration of the machine allows for re-configuration to provide for storage of floral arrangements of different heights.

Each viewing window 24 is provided with four lights 28 around its edges. These lights 28 serve to illuminate the floral arrangement 23 visible through window 24 and the heat from the lights serves to inhibit fogging of window 24 due to the refrigerated interior. A spotlight may also be provided mounted to illuminate the viewable floral arrangement to make it more visible to potential purchasers.

Machine 10 is stocked so that each rotary shelf 16 carries the same type of floral arrangement 23. A person wishing to purchase a floral arrangement chooses which type of arrangement 23 they wish to purchase by looking in viewing window 24 of each module 14. To purchase, they either make payment by inserting cash at payment panel 34, or instruct payment from a financial account such as by swiping a credit card and interacting with touch screen 40. The person then presses the selection button 36 on the module 14 that houses their desired floral arrangement 23. This causes viewing window 24 to slide sideways, allowing the person access to remove one floral arrangement from machine 10. After removal of the arrangement, viewing window 24 closes and the appropriate rotary shelf 16 rotates to bring into view through viewing window 24 the next floral arrangement of the type that was purchased. In an alternative arrangement, the person is allowed to remove one floral arrangement through an access door that may be provided adjacent to the viewing window 24.

A receipt printer is provided adjacent to payment slot 34 that also serves to print message cards for use with floral arrangements purchased from machine 10. By entering their desired message at touch screen 40 the person can obtain a printed message card from the receipt printer. This card may then be inserted into a card holder provided with the purchased floral arrangement 23.

By using telephone 38, or touch screen 40, a person can place orders with florists for them to deliver floral arrangements to other locations.

Machine 10 includes a modem that allows machine to communicate with remote computer systems. This allows remote determination by the operator of the machine of sales transaction history, clearing funds, stock levels, and the age of the stock in the machine.

Machine 10 includes a CD player activated by a motion sensor. The motion sensor activates the CD player if movement is detected near to the machine. This automatically provides sound that can be used to motivate a person near to the machine to purchase from the machine.

A motion sensor can detect tampering of the machine which activates an internal siren and contacts a security service to alert them to investigate the tampering.

The machine may be provided with a secure attachment point for example at the base of the machine so that the machine may be securely fixed to the floor or a sturdy object to resist theft of the machine.

Machine 10 is generally circular. It does not need to be placed against a wall and hence people can approach the machine from any angle. Providing a viewing window 24 in both the front and back of the machine allows people to determine the contents of the machine when standing either to the front or to the back of the machine.

It is to be understood that floral arrangements include floral arrangements consisting of a single flower, a basket of fruit or a single fruit.

Any reference to prior art contained herein is not to be taken as an admission that the information is common general knowledge, unless otherwise indicated.

Finally, it is to be appreciated that various alterations or additions may be made to the parts previously described without departing from the spirit or ambit of the present invention.

The invention claimed is:

1. A floral arrangement vending machine operatively configured to store floral arrangements therewithin and to selectively dispense or allow retrieval of a floral arrangement upon receipt of a payment therefor, said machine comprising:

a stack of carousels which are generally circular in plan view and each of which is configured to support a plurality of floral arrangements in separated compartments;

a stack of at least two generally cylindrical modules, each of which has an exterior wall, the modules being interchangeably stackable to different configurations to form differently-sized machines, each generally cylindrical module containing at least one carousel therewithin, each module having an access door via which controlled access to a compartment of a carousel contained within the module can be had, the modules configured to contain floral arrangements in a suitably sealed manner to prevent unauthorized access to a carousel compartment;

a generally cylindrical enclosed exterior housing formed from the exteriors of the stacked generally cylindrical modules; and an access control mechanism and structure operatively associated with the access doors and operative to control access to a carousel compartment in response to receipt of payment for a floral arrangement, wherein, at least one carousel includes a rotary shelf, the at least one shelf is perforated to allow air to flow through the shelf into adjacent modules, the exterior housing further includes a transparent dome mounted over the upper most carousel for creating a sufficiently warm environment for housing tropical plants and for allowing light to filter down through the modules, the carousels are configured to rotate about a common central axis extending parallel to the stack, and each carousel is configured to rotate relative to its module.

2. A machine according to claim 1 wherein the exterior housing is substantially air-tight.

3. A machine according to claim 1 wherein inside of the housing is refrigerated.

4. A machine according to claim 1 including a sensor that is arranged to activate a sound reproduction device when a person is sensed near to the machine.

5. A machine according to claim 1 wherein all of the plurality of floral arrangements supported on each carousel are vended at the same price.

6. A machine according to claim 1 wherein the carousels are stacked together in a modular arrangement.

7. A machine according to claim 6 wherein at least one of the carousels includes a rotary shelf.

8. A machine according to claim 1 wherein at least one rotary shelf includes steel dividers that allow removal of only one floral arrangement during a single vending operation.

9. A machine according to claim 1, wherein:

the machine has a front and a back and includes at least one viewing window associated with each carousel, each viewing window being arranged to permit viewing of only one floral arrangement; the at least one viewing window was positioned towards either one or both of the front or back of the machine; and light from outside the machine may reach the floral arrangements on the carousel only by passing through the at least one viewing window.

10. A machine according to claim 1 wherein a light is provided at an edge of at least one viewing window.

11. A machine according to claim 1 wherein lights are provided about four edges of at least one viewing window.

12. A machine according to claim 1 further including a spotlight arranged to illuminate a floral arrangement viewable through a viewing window.

13. A machine according to claim 1 wherein at least one viewing window is arranged to allow for vending of floral arrangements through the viewing window.

14. A machine according to claim 13 wherein at least one of the carousels includes a rotary shelf.

15. A machine according to claim 1 wherein at least one rotary shelf includes steel dividers that allow removal of only one floral arrangement during a single vending operation.

* * * * *